United States Patent
Kimoto et al.

(10) Patent No.: US 7,941,578 B2
(45) Date of Patent: May 10, 2011

(54) MANAGING COMMAND REQUEST TIME-OUTS IN QOS PRIORITY QUEUES

(75) Inventors: Christian A. Kimoto, Maridian, ID (US); Douglas L. Voigt, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 206 days.

(21) Appl. No.: 12/243,874

(22) Filed: Oct. 1, 2008

(65) Prior Publication Data

US 2010/0082856 A1   Apr. 1, 2010

Related U.S. Application Data

(60) Provisional application No. 61/060,527, filed on Jun. 11, 2008.

(51) Int. Cl.
*G06F 3/00* (2006.01)
(52) U.S. Cl. .............. 710/52; 710/56; 710/57
(58) Field of Classification Search .......... 710/45
See application file for complete search history.

(56) References Cited

U.S. PATENT DOCUMENTS

| | | | |
|---|---|---|---|
| 5,231,633 A * | 7/1993 | Hluchyj et al. | 370/429 |
| 5,581,544 A * | 12/1996 | Hamada et al. | 370/253 |
| 5,691,975 A * | 11/1997 | Hamada et al. | 370/232 |
| 5,917,804 A * | 6/1999 | Shah et al. | 370/230 |
| 5,956,341 A * | 9/1999 | Galand et al. | 370/412 |
| 6,430,156 B1 * | 8/2002 | Park et al. | 370/232 |
| 6,963,585 B1 * | 11/2005 | Le Pennec et al. | 370/468 |
| 7,072,295 B1 * | 7/2006 | Benson et al. | 370/230 |
| 7,093,044 B2 * | 8/2006 | Joy et al. | 710/110 |
| 7,149,185 B1 * | 12/2006 | Suni | 370/230 |
| 7,274,691 B2 * | 9/2007 | Rogers | 370/389 |
| 7,408,876 B1 * | 8/2008 | Gupta et al. | 370/230 |
| 7,535,913 B2 * | 5/2009 | Minami et al. | 370/401 |
| 7,539,756 B2 * | 5/2009 | Marchetto et al. | 709/226 |
| 7,697,519 B2 * | 4/2010 | Arndt | 370/389 |
| 7,768,910 B2 * | 8/2010 | Neidhardt et al. | 370/230 |
| 2006/0165103 A1 * | 7/2006 | Trudeau et al. | 370/401 |
| 2007/0171830 A1 * | 7/2007 | Vulkan et al. | 370/235 |
| 2008/0123690 A1 * | 5/2008 | Wang et al. | 370/468 |
| 2008/0162735 A1 * | 7/2008 | Voigt et al. | 710/6 |
| 2009/0210876 A1 * | 8/2009 | Shen et al. | 718/100 |

OTHER PUBLICATIONS

SCSI Primary Commands—3, 2005, T10, p. 87.*

* cited by examiner

*Primary Examiner* — Cheng-Yuan Tseng (57) ABSTRACT

In one embodiment a storage controller comprises a processor, a computer readable storage medium coupled to the processor, and logic instructions in the memory module which, when executed by the processor, configure the processor to receive, in a quality of service module, a first command request from a host initiator port, associate a time-out threshold with the first command request, determine, in the quality of service module, whether an available priority queue can release the first command request for execution by a scheduling module within the time-out threshold; and in response to a determination that an available priority queue can release the first command request for execution within the time-out threshold, assign the first command request to the available priority queue.

13 Claims, 7 Drawing Sheets

MANAGING COMMAND REQUEST TIME-OUTS IN QOS PRIORITY QUEUES

CROSS REFERENCE TO RELATED APPLICATIONS

This Application claims the benefit of provisional patent application Ser. No. 61/060,527, filed Jun. 11, 2008, titled "Managing Command Request Time-Outs In QOS Priority Queues" which application is incorporated by reference herein as if reproduced in full below.

BACKGROUND

Effective collection, management, and control of information has become a central component of modern business processes. To this end, many businesses, both large and small, now implement computer-based information management systems.

Data management is an important component of computer-based information management systems. Many users now implement storage networks to manage data operations in computer-based information management systems. Storage networks have evolved in computing power and complexity to provide highly reliable, managed storage solutions that may be distributed across a wide geographic area.

Some storage network components implement quality of service (QoS) operations to manage workflow through the storage components. Effective management of QoS operations is desirable to maintain adequate performance levels in storage networks when servers and applications use networks to share storage components.

DETAILED DESCRIPTION

Described herein are exemplary systems and methods to manage command request time-outs in the presence of quality of service (QoS) priority queues. Certain methods described herein may be embodied as logic instructions and associated data on a computer-readable storage medium. When executed on one or more processors, e.g., a processor on a storage controller, the logic instructions cause the processor(s) to be programmed as a special-purpose machine that implements the described methods. The processor(s), when configured by the logic instructions to execute the methods recited herein, constitute structure for performing the described methods.

In some embodiments, subject matter described herein may be implemented in a storage architecture that provides data storage at a system level, such as, e.g., a storage area network (SAN). In implementations described herein, computing systems that utilize storage are referred to as hosts. For example, a host may be a supercomputer processing large databases, a transaction processing server maintaining transaction records, and the like. Alternatively, the host may be a file server on a local area network (LAN) or wide area network (WAN) that provides storage services for an enterprise.

In a direct-attached storage solution, a host may include one or more disk controllers or RAID controllers configured to manage multiple directly attached disk drives. By contrast, in a SAN a host connects to the SAN in accordance via a high-speed connection technology such as, e.g., a fibre channel (FC) fabric in the particular examples.

A SAN architecture may comprise one or more storage cells, where each storage cell comprises a group of storage devices sometimes referred to as a disk group. Each storage cell comprises at least one storage controller coupled to the disk group, and in some embodiments the storage cell may implement redundant storage controllers. The storage controllers are coupled to the storage devices using a high-speed data connection, e.g., a fibre channel arbitrated loop connection, or through a network such as a fibre channel fabric or the like. The storage controllers may also be coupled to each other through point-to-point connections to enable them to manage the presentation of storage capacity to computers using the storage capacity.

Network architectures described herein represent a distributed computing environment such as, e.g., an enterprise computing system using a private SAN. However, the network architectures may be readily scaled upwardly or downwardly to meet the needs of a particular application.

Figure 1:
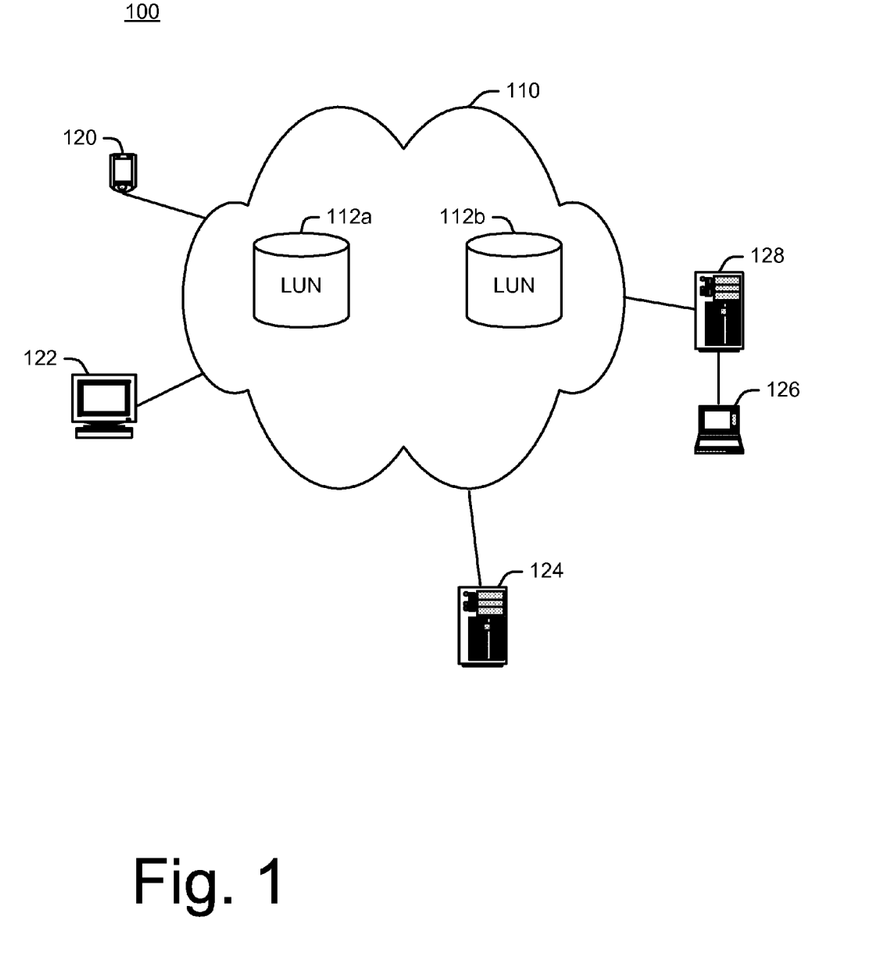
FIG. 1 is a schematic illustration of a networked computing system that utilizes a storage network, according to embodiments.

FIG. 1 is a schematic illustration of one embodiment of a networked computing system 100 that utilizes a storage network. In one embodiment, storage pool 110 may be implemented as a virtualized storage pool as described in published U.S. Patent Application Publication No. 2003/0079102 to Lubbers, et al., or as described in U.S. Patent Application No. 2005/0172073 to Voigt, et al., the disclosures of which are incorporated herein by reference in their entirety.

Referring to FIG. 1, storage network 100 comprises a storage pool 110, which comprises an arbitrarily large quantity of storage space. In practice, a storage pool 110 has a finite size limit determined by the particular hardware used to implement the storage pool 110. However, there are few theoretical limits to the storage space available in a storage pool 110.

A plurality of logical disks (also called logical units or LUNS) 112a, 112b may be allocated within storage pool 110. Each LUN 112a, 112b comprises a contiguous range of logical addresses that can be addressed by host devices 120, 122, 124 and 128 by mapping requests from the connection protocol used by the host device to the uniquely identified LUN 112. As used herein, the term "host" comprises a computing system(s) that utilize storage on its own behalf, or on behalf of systems coupled to the host. For example, a host may be a supercomputer processing large databases or a transaction processing server maintaining transaction records. Alternatively, a host may be a file server on a local area network (LAN) or wide area network (WAN) that provides storage services for an enterprise. A file server may comprise one or more disk controllers and/or RAID controllers configured to manage multiple disk drives. A host connects to a storage network via a communication connection such as, e.g., a Fibre Channel (FC) connection.

A host such as server 128 may provide services to other computing or data processing systems or devices. For example, client computer 126 may access storage pool 110 via a host such as server 128. Server 128 may provide file services to client 126, and may provide other services such as transaction processing services, email services, etc. Hence, client device 126 may or may not directly use the storage consumed by host 128.

Devices such as wireless device 120, and computers 122, 124, which may also function as hosts, may logically couple directly to LUNs 112a, 112b. Hosts 120-128 may couple to multiple LUNs 112a, 112b, and LUNs 112a, 112b may be shared among multiple hosts. Each of the devices shown in FIG. 1 may include memory, mass storage, and a degree of data processing capability sufficient to manage a network connection.

Figure 2:
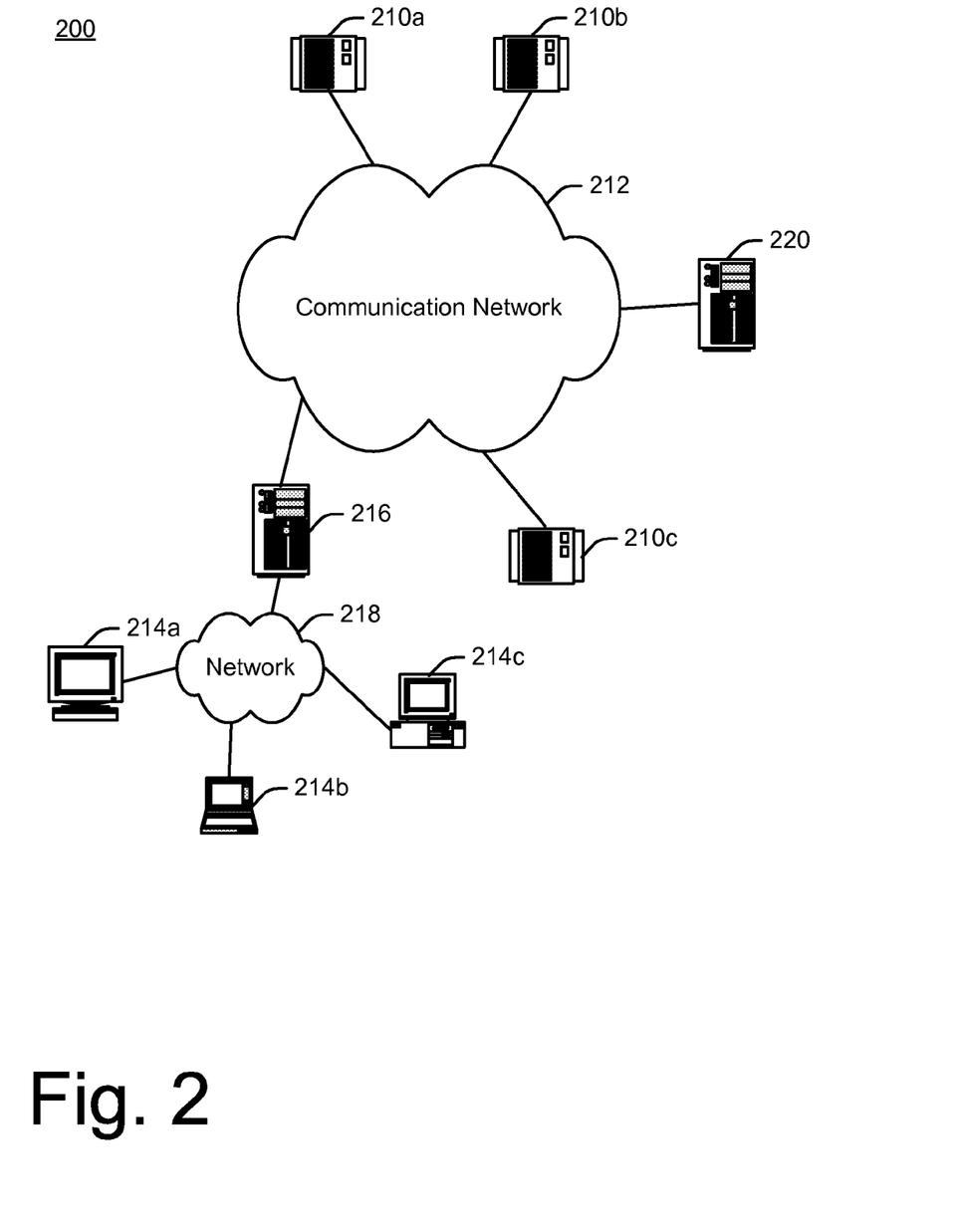
FIG. 2 is a schematic illustration of an exemplary implementation of a storage network, according to embodiments.

FIG. 2 is a schematic illustration of an exemplary storage network 200 that may be used to implement a storage pool such as storage pool 110. Storage network 200 comprises a plurality of storage cells 210a, 210b, 210c connected by a communication network 212. Storage cells 210a, 210b, 210c may be implemented as one or more communicatively connected storage devices. Communication network 212 may be implemented as a private, dedicated network such as, e.g., a Fibre Channel (FC) switching fabric. Alternatively, portions of communication network 212 may be implemented using public communication networks pursuant to a suitable communication protocol such as, e.g., the Internet Small Computer Serial Interface (iSCSI) protocol.

Client computers 214a, 214b, 214c may access storage cells 210a, 210b, 210c through a host, such as servers 216, 220. Clients 214a, 214b, 214c may be connected to file server 216 directly, or via a network 218 such as a Local Area Network (LAN) or a Wide Area Network (WAN). The number of storage cells 210a, 210b, 210c that can be included in any storage network is limited primarily by the connectivity implemented in the communication network 212. By way of example, a switching fabric comprising a single FC switch can interconnect 256 or more ports, providing a possibility of hundreds of storage cells 210a, 210b, 210c in a single storage network.

Each of the devices shown in FIGS. 1 and 2 may include memory, mass storage, and a degree of data processing capability sufficient to manage a network connection. The computer program devices in accordance with the present invention are implemented in the memory of the various devices shown in FIGS. 1 and 2 and enabled by the data processing capability of the devices shown in FIGS. 1 and 2.

Figure 3:
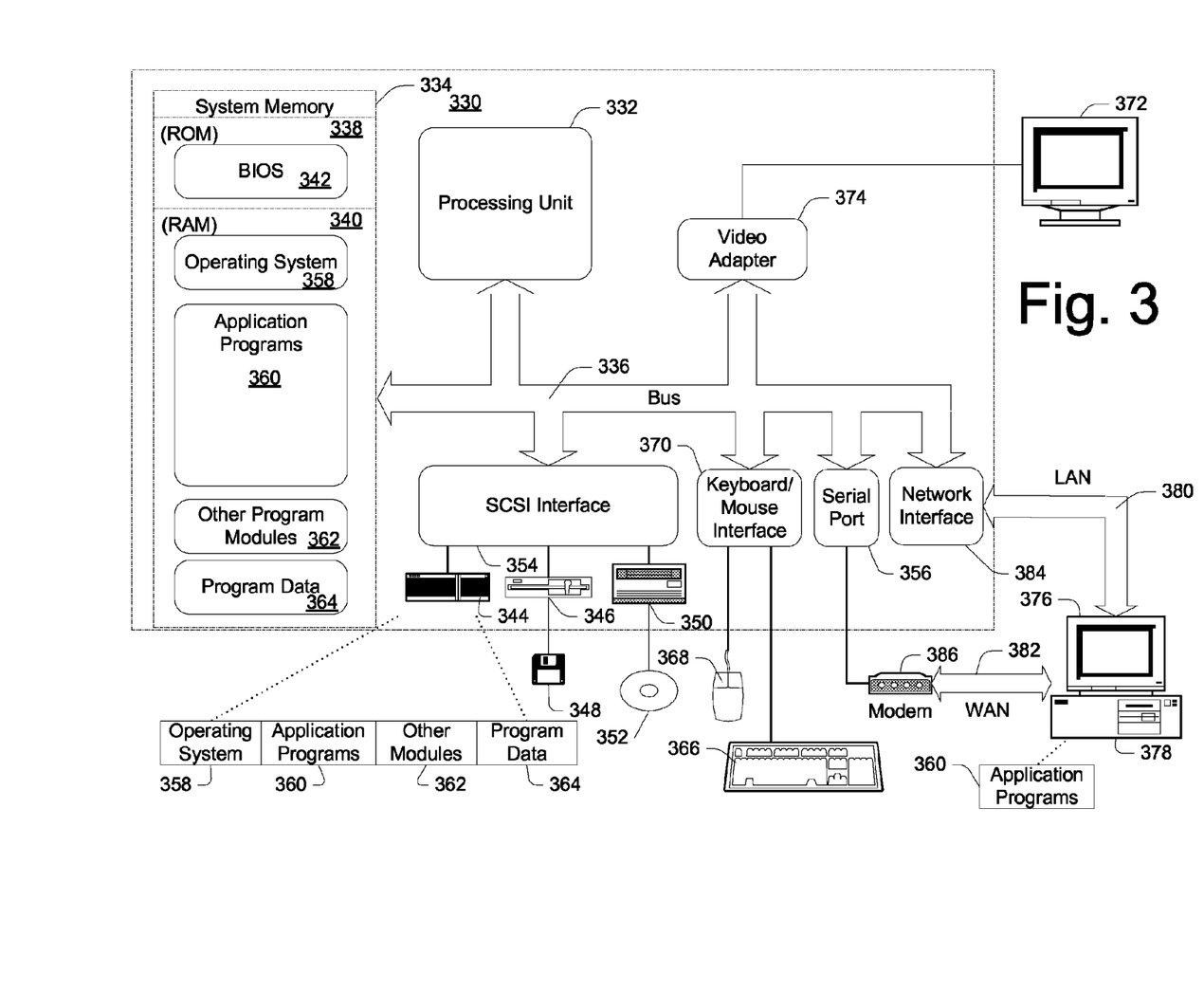
FIG. 3 is a schematic illustration of an exemplary implementation of a computing device that can be utilized to implement a host, according to embodiments.

Hosts 216, 220 are typically implemented as server computers. FIG. 3 is a schematic illustration of an exemplary computing device 330 that can be utilized to implement a host. Computing device 330 includes one or more processors or processing units 332, a system memory 334, and a bus 336 that couples various system components including the system memory 334 to processors 332. The bus 336 represents one or more of any of several types of bus structures, including a memory bus or memory controller, a peripheral bus, an accelerated graphics port, and a processor or local bus using any of a variety of bus architectures. The system memory 334 includes read only memory (ROM) 338 and random access memory (RAM) 340. A basic input/output system (BIOS) 342, containing the basic routines that help to transfer information between elements within computing device 330, such as during start-up, is stored in ROM 338.

Computing device 330 further includes a hard disk drive 344 for reading from and writing to a hard disk (not shown), and may include a magnetic disk drive 346 for reading from and writing to a removable magnetic disk 348, and an optical disk drive 350 for reading from or writing to a removable optical disk 352 such as a CD ROM or other optical media. The hard disk drive 344, magnetic disk drive 346, and optical disk drive 350 are connected to the bus 336 by a SCSI interface 354 or some other appropriate interface. The drives and their associated computer-readable media provide nonvolatile storage of computer-readable instructions, data structures, program modules and other data for computing device 330. Although the exemplary environment described herein employs a hard disk, a removable magnetic disk 348 and a removable optical disk 352, other types of computer-readable media such as magnetic cassettes, flash memory cards, digital video disks, random access memories (RAMs), read only memories (ROMs), and the like, may also be used in the exemplary operating environment.

A number of program modules may be stored on the hard disk 344, magnetic disk 348, optical disk 352, ROM 338, or RAM 340, including an operating system 358, one or more application programs 360, other program modules 362, and program data 364. A user may enter commands and information into computing device 330 through input devices such as a keyboard 366 and a pointing device 368. Other input devices (not shown) may include a microphone, joystick, game pad, satellite dish, scanner, or the like. These and other input devices are connected to the processing unit 332 through an interface 370 that is coupled to the bus 336. A monitor 372 or other type of display device is also connected to the bus 336 via an interface, such as a video adapter 374.

Computing device 330 may operate in a networked environment using logical connections to one or more remote computers, such as a remote computer 376. The remote computer 376 may be a personal computer, a server, a router, a network PC, a peer device or other common network node, and typically includes many or all of the elements described above relative to computing device 330, although only a memory storage device 378 has been illustrated in FIG. 3. The logical connections depicted in FIG. 3 include a LAN 380 and a WAN 382.

When used in a LAN networking environment, computing device 330 is connected to the local network 380 through a network interface or adapter 384. When used in a WAN networking environment, computing device 330 typically includes a modem 386 or other means for establishing communications over the wide area network 382, such as the Internet. The modem 386, which may be internal or external, is connected to the bus 336 via a serial port interface 356. In a networked environment, program modules depicted relative to the computing device 330, or portions thereof, may be stored in the remote memory storage device. It will be appreciated that the network connections shown are exemplary and other means of establishing a communications link between the computers may be used.

Hosts 216, 220 may include host adapter hardware and software to enable a connection to communication network 212. The connection to communication network 212 may be through an optical coupling or more conventional conductive cabling depending on the bandwidth requirements. A host adapter may be implemented as a plug-in card on computing device 330. Hosts 216, 220 may implement any number of host adapters to provide as many connections to communication network 212 as the hardware and software support.

Generally, the data processors of computing device 330 are programmed by means of instructions stored at different times in the various computer-readable storage media of the computer. Programs and operating systems may distributed, for example, on floppy disks, CD-ROMs, or electronically, and are installed or loaded into the secondary memory of a computer. At execution, the programs are loaded at least partially into the computer's primary electronic memory.

Figure 4:
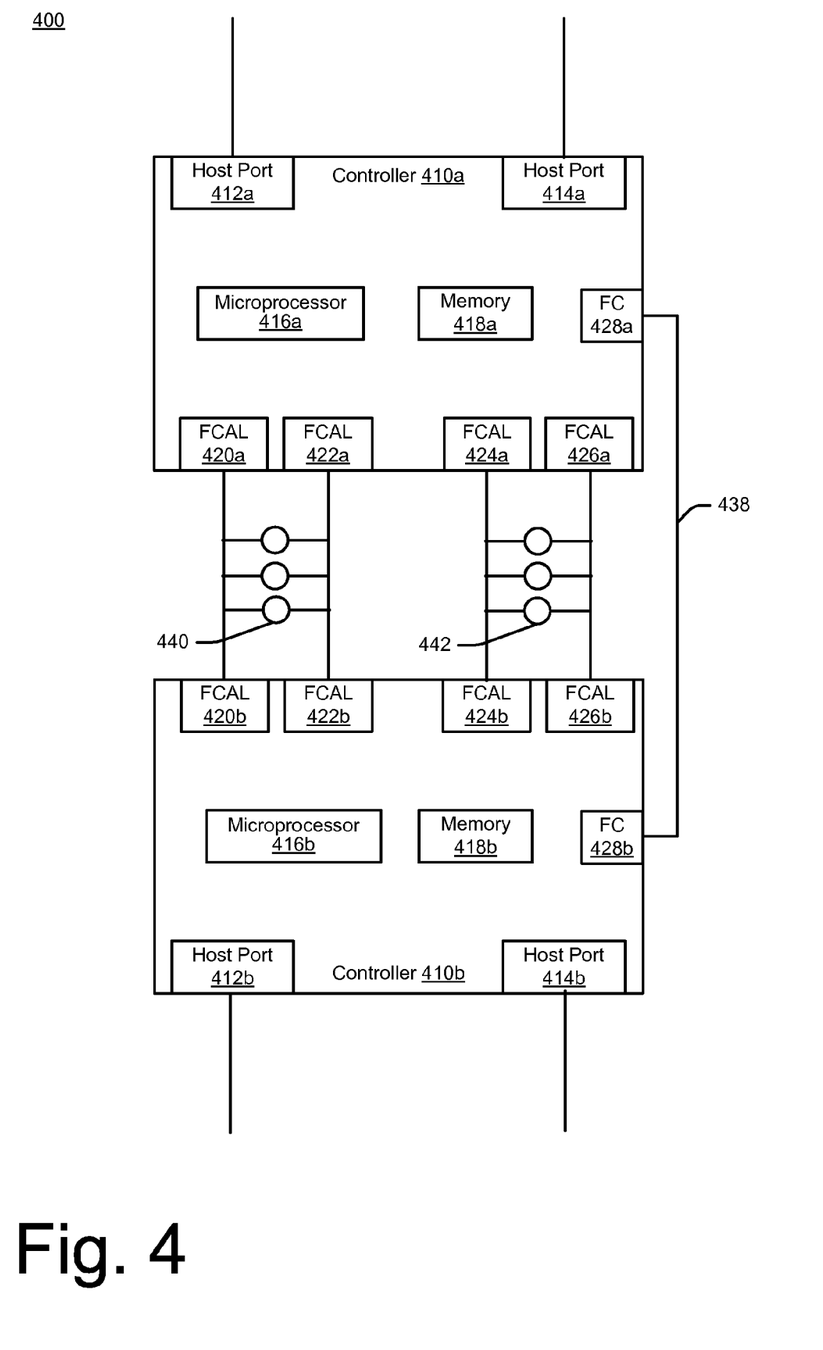
FIG. 4 is a schematic illustration of an exemplary implementation of a storage cell, according to embodiments.

FIG. 4 is a schematic illustration of an exemplary implementation of a storage cell 400 that may be used to implement a storage cell such as 210a, 210b, or 210c. Referring to FIG. 4, storage cell 400 includes two Network Storage Controllers (NSCs), also referred to as disk array controllers, 410a, 410b to manage the operations and the transfer of data to and from one or more disk arrays 440, 442. NSCs 410a, 410b may be implemented as plug-in cards having a microprocessor 416a, 416b, and memory 418a, 418b. Each NSC 410a, 410b includes dual host adapter ports 412a, 414a, 412b, 414b that provide an interface to a host, i.e., through a communication network such as a switching fabric. In a Fibre Channel implementation, host adapter ports 412a, 412b, 414a, 414b may be implemented as FC N_Ports. Each host adapter port 412a, 412b, 414a, 414b manages the login and interface with a switching fabric, and is assigned a fabric-unique port ID in the login process. The architecture illustrated in FIG. 4 provides a fully-redundant storage cell; only a single NSC is required to implement a storage cell.

Each NSC 410a, 410b further includes a communication port 428a, 428b that enables a communication connection 438 between the NSCs 410a, 410b. The communication connection 438 may be implemented as a FC point-to-point connection, a PCI connection, or pursuant to any other suitable communication protocol.

In an exemplary implementation, NSCs 410a, 410b further include a plurality of Fiber Channel Arbitrated Loop (FCAL) ports 420a-426a, 420b-426b that implement an FCAL communication connection with a plurality of storage devices, e.g., arrays of disk drives 440, 442. While the illustrated embodiment implement FCAL connections with the arrays of disk drives 440, 442, it will be understood that the communication connection with arrays of disk drives 440, 442 may be implemented using other communication protocols. For example, rather than an FCAL configuration, a FC switching fabric, SATA (Serial ATA), a small computer serial interface (SCSI), or a Serial Attached SCSI (SAS) connection may be used.

In operation, the storage capacity provided by the arrays of disk drives 440, 442 may be added to the storage pool 110. When an application requires storage capacity, logic instructions on a host computer 128 establish a LUN from storage capacity available on the arrays of disk drives 440, 442 available in one or more storage sites. It will be appreciated that, because a LUN is a logical unit, not necessarily a physical unit, the physical storage space that constitutes the LUN may be distributed across multiple storage cells. Data for the application is stored on one or more LUNs in the storage network. An application that needs to access the data queries a host computer, which retrieves the data from the LUN and forwards the data to the application.

As mentioned above, in some embodiments, systems and methods to manage command request priority in quality of service (QoS) priority queues are provided. In some implementations, the systems and methods enable users of a storage network to manage the release rate of the input/output commands based on priority values associated with the user, or with a particular user session. Based on a given priority queue length, i.e., the number of commands in the priority queue, and the release rate of commands from the priority queue, an incoming command request may be delayed for a period of time sufficient to cause the host which initiated the command request to mistakenly time out the command request. In such cases a timeout that resulted from intentional QoS queue management may be misinterpreted as a failure event that may require service or repair. This mistake can be costly in terms of unnecessary repairs and consternation. In some embodiments, systems and methods described herein facilitate management of such time out scenarios by generating a busy status response message to inform the host that the priority queue is too busy to handle the incoming command request.

Figure 5:
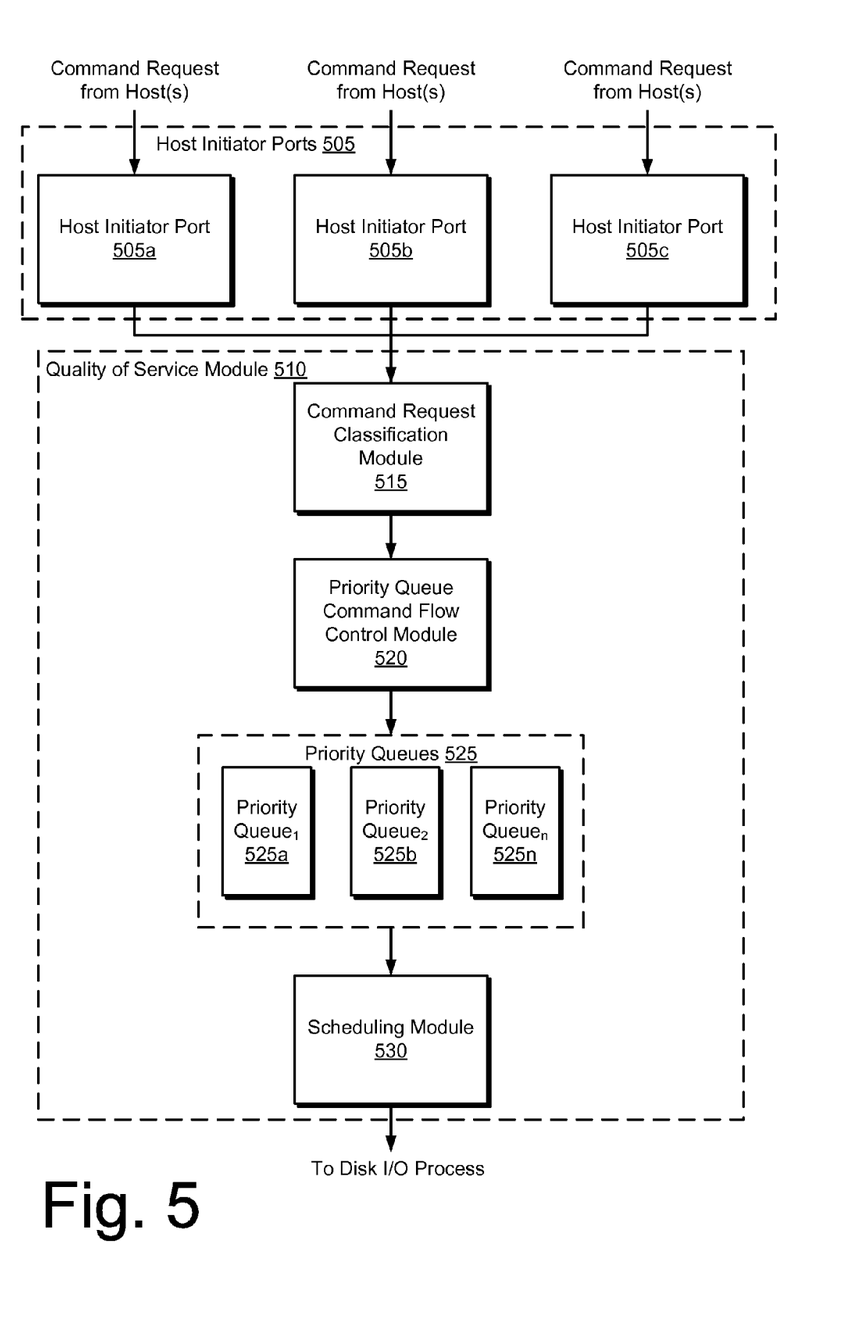
FIG. 5 is a schematic illustration of logical components of a QoS module, according to embodiments.

FIG. 5 is a schematic illustration of logical components of a QoS module, according to embodiments. In some embodiments, a QoS module may be implemented as logic instructions stored in a computer readable medium associated with a storage controller such as the memory module 418a, 418b of one of the storage controllers 410a, 410b and maybe executed by on the processor 416a, 416b associated with the storage controller 410a, 410b. In alternate embodiments, a QoS module may be implemented as a firmware module, or may be reduced to circuitry, for example in an application-specific integrated circuit (ASIC) or the like.

Referring to FIG. 5, a storage controller comprises a plurality of host initiator ports 505a, 505b, 505c which receive command requests from host devices. In the embodiment depicted in FIG. 5, the storage controller comprises three host initiator ports 505a, 505b, 505c. In alternate embodiments the storage controller may have as few as one host initiator port. In theory, there is no upper limit to the number of host initiator ports on a storage controller.

A quality of service module 510 is positioned in the data flow to receive command requests from the host initiator ports 505a, 505b, 505c. Quality of service module 510 comprises a command request classification module 515, a priority queue command flow control module 520, a set of priority queues 525, and a scheduling module 530. Further aspects of quality of service module 510 will be explained with reference to FIG. 5 and FIG. 6, which is a flowchart illustrating operations in a method manage command request time-outs in quality of service (QoS) priority queues according to embodiments.

By way of overview, in some embodiments the quality of service module 510 receives a command request from one of the initiator ports 505a, 505b, 505c, associates a timeout threshold with the command request, and assigns the command request to a priority queue if the priority queue can process the command request within the timeout threshold. In embodiments in which the timeout threshold is embedded in the command requests, the timeout threshold can be extracted from the command request. By contrast, in embodiments in which the timeout threshold is stored in a memory module, the command request may include an identifier or other information which the priority queue flow control module 520 can use to retrieve the timeout threshold from the memory module. For example, the identifier may identify the specific host, requester, or user session which generated the command requests. Alternatively other information can be inferred from the command including the result of the classification decision.

Figure 6:
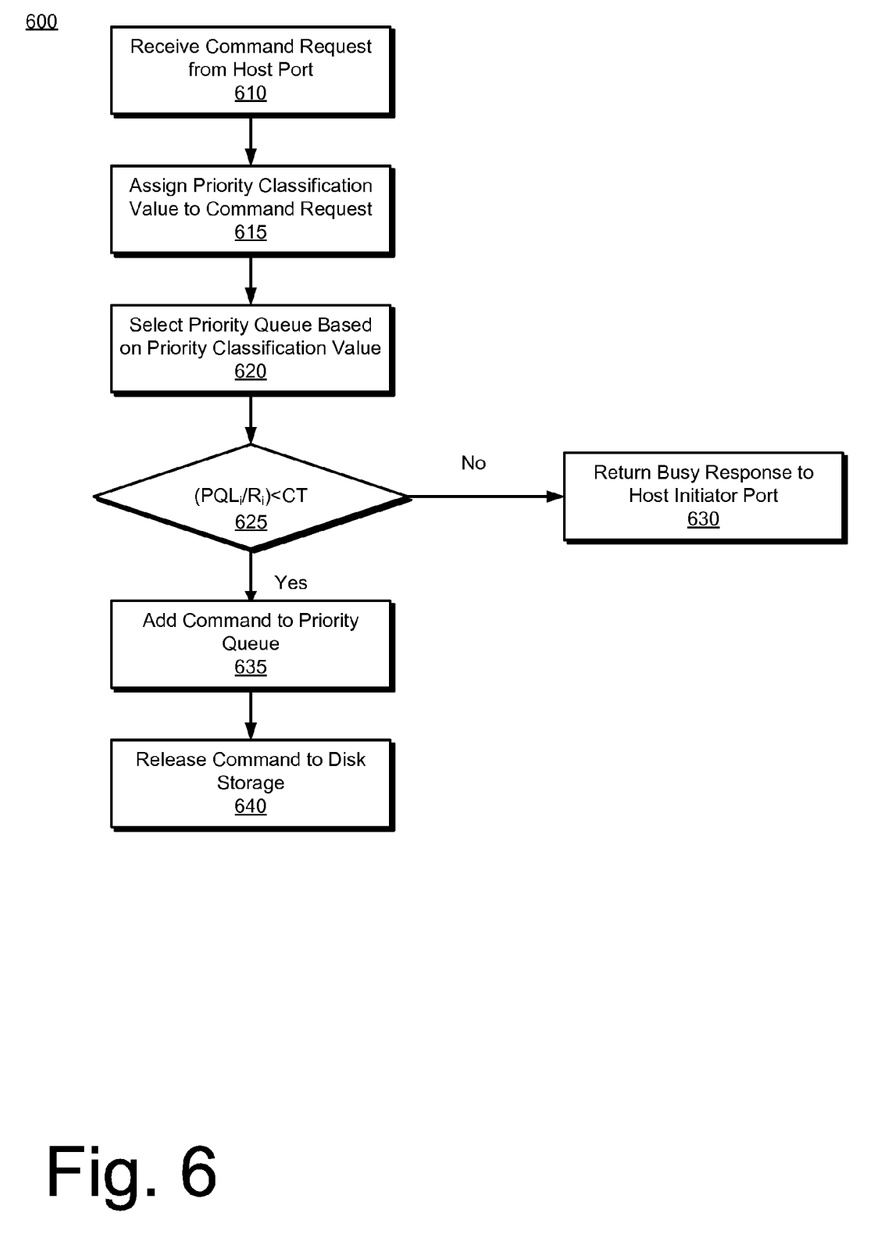
FIG. 6 is a flowchart illustrating operations in a method to manage command request priority time-outs in quality of service (QoS) priority queues according to embodiments.

Referring to FIG. 5 and FIG. 6, command requests from the host initiator ports are received (operation 610) in the command request classification module 515, which separates incoming command requests by assigning (operation 615) a classification value with each command request. Techinques for assigning classification values to command requests are described in U.S. patent application Ser. No. 11/648,742, to Voigt, et al., filed Dec. 29, 2006, entitled Methods and Systems for Prioritizing Inputs/Outputs to Storage Devices, the disclosure of which is incorporated herein by reference in its entirety. For example, incoming command requests may be classified according to a target logical unit (LUN), a particular port, a small computer serial interface (SCSI) Initiator_Target_LUN (ITL) nexus, or an Initiator_Target_LUN_Queue (ITLQ) nexus.

At operation 620 a priority queue is selected based on the priority classification value assigned to the command request. In the embodiment depicted in FIG. 6, the command request classification module 515 assigns command requests to a unique priority queue.

Command requests are input to the priority queue command flow control module 520, which implements a command flow control algorithm to determine whether an incoming command request can be processed by the assigned priority queue 525 within a time-out threshold. In one embodiment, the time out threshold is a value which represents a time duration a command request can be held in the priority queue before the command request is timed out by the requester. In alternate embodiments, the time out threshold represents a time duration for which a command request can be held before the command is executed. In practice, the time out threshold may be set by a user of the system or an administrator of the system and communicated to the storage array through its management protocol. The time out threshold may be associated with a specific host, a specific requester or a specific user session. Some embodiments the timeout threshold may be encapsulated with the command request. In alternate embodiments the timeout threshold associated with a specific host, requester, or user session may be transmitted to the quality of service module upon initiation of service to the host request or, user session and may be stored in a suitable memory location, e.g., the memory 418a, 418b of the storage controller 410a, 410b.

Thus, at operation 625 the selected priority queue is evaluated to determine whether the selected priority queue will release the command request for execution within the timeout threshold associated with the command request. In this regard, in some embodiments, the priority queue command flow control module 520 monitors the priority queue length (PQL) and the release rate (R) for each priority queue 525. The priority queue length (PQL) indicates the number of command requests in each priority queue, and the release rate (R) represents the rate at which command requests are released from the priority queue. In order to determine whether a particular priority queue can execute a command request within the timeout threshold associated with the command request, the priority queue command flow control module 520 determines, at operation 625, whether the priority queue length for a given priority queue ($PQL_i$) divided by the release rate for the priority queue ($R_i$) is less than the command timeout threshold (CT) associated with the command. In embodiments in which the command timeout threshold (CT) includes an execution time, an expected execution time (ET) may be subtracted from the timeout threshold to compensate for the expected time required to execute the command.

If, at operation 625, the priority queue under evaluation can not execute the command request within the timeout threshold, then control passes to operation 630 and a queue full response or any other indication of failure to execute due to work flow constraints is sent to the host port that initiated the command request. By contrast, if at operation 625 the priority queue can execute the command request within the timeout threshold, then control passes to operation 635 and the command request is added to the selected priority queue 525.

Command requests are removed from the head of each command queue 525 at the release rate (R) designated for the priority queue. At operation 640 commands released from the priority queues are released to the disk storage. In one embodiment, command requests are placed into the data flow path for further input/output processing by the storage controller in order to execute the command request.

Thus, the structure depicted in FIG. 5 and the operations depicted in FIG. 6 enable a quality of service module to evaluate whether command requests can be processed within a timeout threshold associated with the command request. The host initiator port is alerted if the command request cannot be processed within the time request. The host initiator port can then implement one or more procedures in response to the busy response signal. For example, the host initiator port can retransmit the command at a later time, throttle back on input/output (I/O) requests, or attempt an alternate mechanism to access the data.

Figure 7:
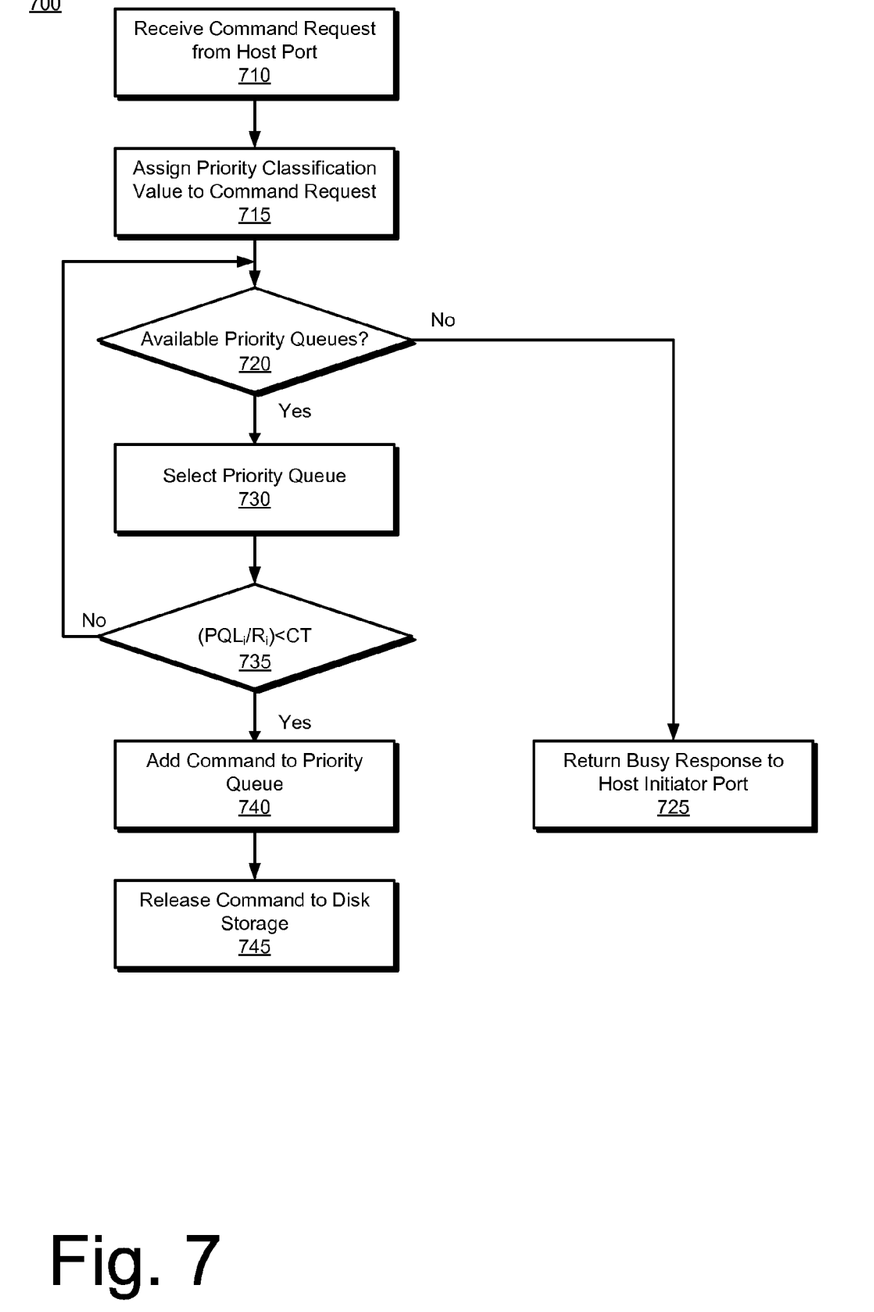
FIG. 7 is a flowchart illustrating operations in a method manage command request priority time-outs in quality of service (QoS) priority queues according to embodiments.

In the embodiment depicted in FIG. 6, the classification scheme implemented by the command request classification module 515 assigns command requests to a specific priority queue. In other embodiments, the classification scheme implemented by the command request classification module 515 may determine a plurality of queues appropriate for a command request. FIG. 7 is a flowchart illustrating operations in a method to manage command request priority time-outs in quality of service (QoS) priority queues according to embodiments. In the embodiment depicted in FIG. 7, the classification scheme implemented by the command request classification module 515 may determine a plurality of queues appropriate for a command request.

Referring to FIG. 7, at operation 710 command requests from the host initiator ports are received in the command request classification module 515, which separates incoming command requests by assigning (operation 715) a classification value with each command request. As described above, techinques for assigning classification values to command requests are described in U.S. patent application Ser. No. 11/648,742, to Voigt, et al., filed Dec. 29, 2006, entitled Methods and Systems for Prioritizing Inputs/Outputs to Storage Devices, the disclosure of which is incorporated herein by reference in its entirety. For example, incoming command requests may be classified according to a target logical unit (LUN), a particular port, a small computer serial interface (SCSI) Initiator_Target_LUN (ITL) nexus, or an Initiator_Target_LUN_Queue (ITLQ) nexus.

Command requests are input to the priority queue command flow control module 520, which implements a command flow control algorithm to determine whether an incoming command request can be processed by one of the priority queues 525. The command request classification module 515 passes command requests to the priority queue command flow control module 520. At operation 720 the priority queue command flow control module 520 determines whether there are any priority queues 525 available for the command request within the plurality of priority queues determined by request classification module 515. As used herein, the term "available" refers to a queue that is determined by the classification module and capable of handling the request. If, at operation 720, there are no available priority queues, then control passes to operation 725 and a busy response is returned to the host initiator port 505 from which the command request was received. In some embodiments, the host initiator port may transmit a busy response to the requester (operation 725).

By contrast, if at operation 720 there are available priority queues, then the priority queue command flow control module 520 selects one of the available priority queues (operation 730) and initiates a process (operation 735) which evaluates available priority queues to determine whether the an available priority queue can execute the command request within the timeout threshold associated with the command request. This process may be implemented as described above with reference to operation 625.

If, at operation 735, the priority queue under evaluation can not execute the command request within the timeout threshold, then control passes back to operation 720 and the priority queue command flow control module 520 evaluates another priority queue. If, at operation 720 there are no more available priority queues available then control passes to operation 725 and a busy response is sent to the host port that initiated the command request. By contrast, if at operation 735 the priority queue can execute the command request within the timeout threshold, then control passes to operation 740 and the command request is added to the priority queue 525 under evaluation.

As described above, command requests are removed from the head of each command queue 525 at the release rate (R) designated for the priority queue. At operation 745 commands released from the priority queues are released to the disk storage. In one embodiment, command requests are placed into the data flow path for further input/output processing by the storage controller in order to execute the command request.

Thus, the structure depicted in FIG. 5 and the operations depicted in FIG. 6 and FIG. 7 enable a quality of service module 510, which may be implemented in a storage array controller 410, to manage command request time outs.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and embodiments are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and embodiments are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and embodiments are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one embodiment" or "some embodiments" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A method to manage command request time-outs in quality of service priority queues, comprising:
receiving, in a quality of service module, a first command request from a host initiator port;
associating a time-out threshold (CT) with the first command request, wherein the time-out threshold is associated with at least one of a specific host, requester, or user session;
determining, in the quality of service module, whether an available priority queue with a priority queue length (PQL) can release the first command request at a release rate (R) for execution by a scheduling module within the time-out threshold such that $$\frac{PQL}{R} < CT;$$

and
in response to a determination that the available priority queue can release the first command request for execution within the time-out threshold, assigning the first command request to the available priority queue, otherwise returning a busy signal to the host initiator port.

2. The method of claim 1, wherein receiving, in a quality of service module, a first command request from a host initiator port comprises receiving a time-out threshold with the first command request.

3. The method of claim 1, wherein:
the time-out threshold is stored in a computer readable storage medium coupled to the quality of service module;
the first command request includes information associated with the timeout threshold; and wherein associating a time-out threshold with the first command request comprises retrieving the time-out threshold from the computer readable storage medium coupled to the quality of service module.

4. The method of claim 1, wherein determining, in the quality of service module, whether an available priority queue can execute the first command request within the time-out threshold comprises:
   determining whether one or more priority queues are available; and
   in response to a determination that one or more priority queues are available, implementing an evaluation process to evaluate available priority queues.

5. The method of claim 4, further comprising:
   in response to a determination that no priority queues are available, returning a busy signal to the host initiator port.

6. The method of claim 1, further comprising issuing the command from the available priority queue to a storage device data flow process.

7. A storage controller, comprising:
   a processor;
   computer readable storage medium coupled to the processor;
   logic instructions in the computer readable storage medium which, when executed by the processor, configure the processor to:
   receive, in a quality of service module, a first command request from a host initiator port;
   associate a time-out threshold (CT) with the first command request;
   determine, in the quality of service module, whether an available priority queue with a priority queue length (PQL) can release the first command request at a release rate (R) for execution by a scheduling module within the time-out threshold such that;

$$\frac{PQL}{R} < CT;$$

and
   in response to a determination that the available priority queue can release the first command request for execution within the time-out threshold, assign the first command request to the available priority queue, otherwise return a busy signal to the host initiator port.

8. The storage controller of claim 7, further comprising logic instructions stored in the computer readable storage medium which, when executed, configure the processor to receiving a time-out threshold with the first command request.

9. The storage controller of claim 7, wherein:
   the time-out threshold is stored in a computer readable storage medium coupled to the quality of service module;
   the first command request includes information associated with the timeout threshold; and further comprising logic instructions stored in the computer readable storage medium which, when executed by the processor, configure the processor to retrieve the time-out threshold from the computer readable storage medium coupled to the quality of service module.

10. The storage controller of claim 9, further comprising logic instructions stored in the computer readable storage medium which, when executed by the processor, configure the processor to determine whether one or more priority queues are available; and
    to implement an evaluation process to evaluate available priority queues in response to a determination that one or more priority queues are available.

11. The storage controller of claim 8, further comprising logic instructions stored in the computer readable storage medium which, when executed by the processor, configure the processor to return a busy signal to the host initiator port in response to a determination that no priority queues are available.

12. The storage controller of claim 7, further comprising logic instructions stored in the computer readable storage medium which, when executed by the processor, configure the processor to issue the command from the available priority queue to a storage device data flow process.

13. A computer program product comprising logic instructions stored on a non-transitory computer-readable storage medium which, when executed by a computer processor in a storage controller, configure the processor to:
    receive, in a quality of service module, a first command request from a host initiator port;
    associate a time-out threshold (CT) with the first command request, wherein the time-out threshold is associated with at least one of a specific host, requester, or user session;
    determine, in the quality of service module, whether an available priority queue with a priority queue length (PQL) can release the first command request at a release rate (R) for execution by a scheduling module within the time-out threshold such that;

$$\frac{PQL}{R} < CT;$$

and
    in response to a determination that the available priority queue can release the first command request for execution within the time-out threshold, assign the first command request to the available priority queue, otherwise return a busy signal to the host initiator port.

* * * * *

UNITED STATES PATENT AND TRADEMARK OFFICE
CERTIFICATE OF CORRECTION

| | | |
|---|---|---|
| PATENT NO. | : 7,941,578 B2 | Page 1 of 1 |
| APPLICATION NO. | : 12/243874 | |
| DATED | : May 10, 2011 | |
| INVENTOR(S) | : Christian A. Kimoto et al. | |

It is certified that error appears in the above-identified patent and that said Letters Patent is hereby corrected as shown below:

In column 11, line 23, in Claim 7, before "computer" insert -- a --.

In column 11, line 36, in Claim 7, delete "that;" and insert -- that --, therefor.

In column 12, line 17, in Claim 11, delete "claim 8," and insert -- claim 7, --, therefor.

In column 12, line 42, in Claim 13, delete "that;" and insert -- that --, therefor.

Signed and Sealed this
Eighth Day of November, 2011

David J. Kappos
*Director of the United States Patent and Trademark Office*